Nov. 29, 1938.  G. M. PESTARINI  2,138,666
DIRECT CURRENT DYNAMO-ELECTRIC MACHINE
Filed Feb. 2, 1937   2 Sheets-Sheet 1
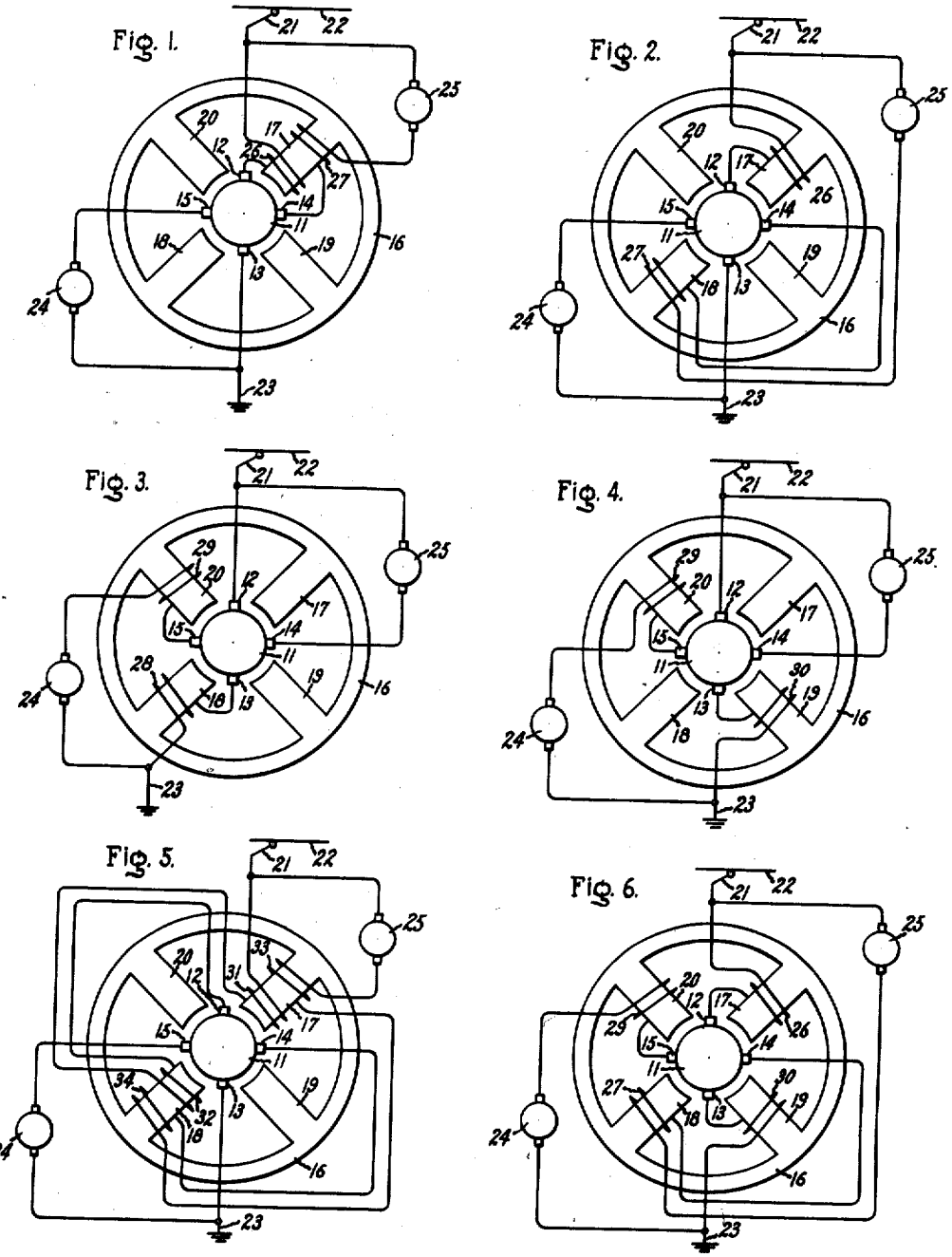
Inventor:
Giuseppe M. Pestarini,
by Harry E. Dunham
His Attorney.

Nov. 29, 1938.　　　G. M. PESTARINI　　　2,138,666
DIRECT CURRENT DYNAMO-ELECTRIC MACHINE
Filed Feb. 2, 1937　　　2 Sheets-Sheet 2
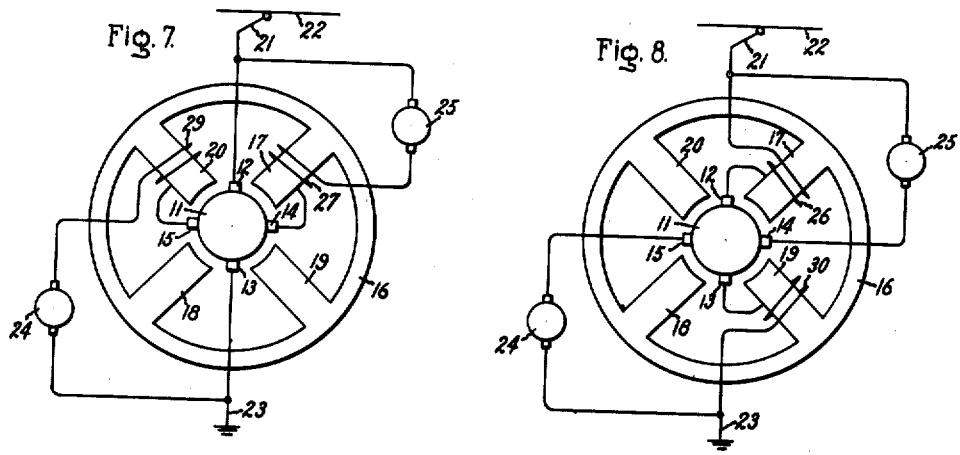
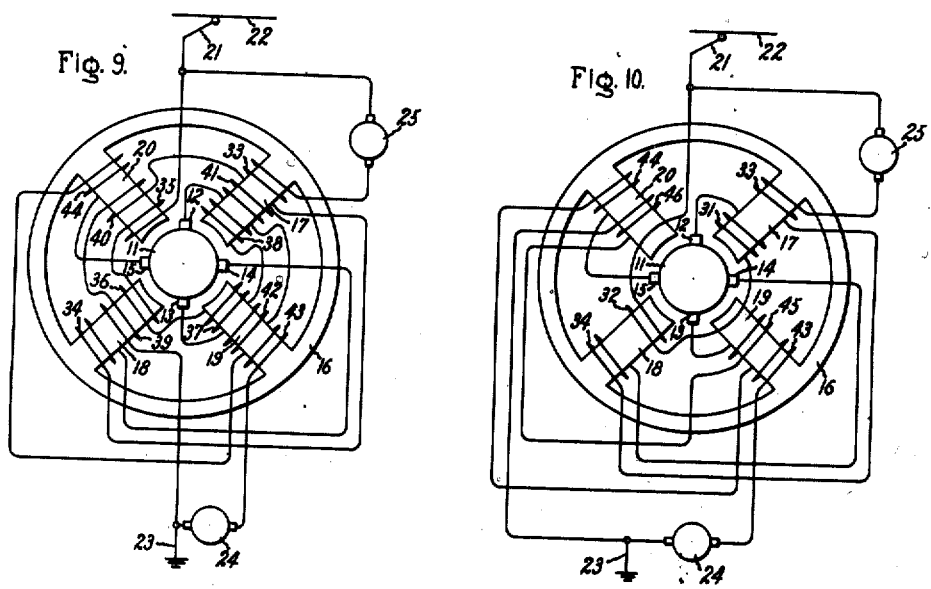
Inventor:
Giuseppe M. Pestarini,
by Harry E. Dunham
His Attorney.

Patented Nov. 29, 1938

2,138,666

UNITED STATES PATENT OFFICE 2,138,666

DIRECT CURRENT DYNAMO-ELECTRIC MACHINE

Giuseppe M. Pestarini, Turin, Italy

Application February 2, 1937, Serial No. 123,715
In Great Britain January 24, 1934

25 Claims. (Cl. 171—123)

This is a continuation in part of my application Serial No. 2,536, filed January 19, 1935.

My invention relates to direct current commutating type dynamo-electric machines, and in particular to rotary transformers and generators of the metadyne type.

A direct current machine of the metadyne type is a dynamo-electric machine which may be operated as a motor, a generator, or a rotary transformer. Essentially, a metadyne is a direct current dynamo-electric machine having a rotor or armature provided with windings, and a commutator of the conventional direct current dynamo-electric machine type, and a stationary member affording a path of low magnetic reluctance to the magnetic flux set up by the armature currents. The commutator of a bipolar metadyne machine usually is provided with two brush sets electrically displaced from each other for providing a primary circuit and a secondary circuit through the metadyne rotatable member or armature. The stationary member of the metadyne also may be provided with various field exciting windings arranged to provide the metadyne with special characteristics and to insure the stability of the machine. In certain applications, it has been found desirable to connect part of the load across a primary brush and a secondary brush, and another part of the load across the other primary brush and the other secondary brush. Such an arrangement provides two loop circuits through the metadyne armature including an external load in each loop, and has been termed an 8 connection. The operation of this type of system is described in my U. S. Patent No. 1,969,699, August 7, 1934. When loads are connected in this manner to a metadyne, there is a tendency for local loop-circulating parasitic currents to arise, as well as, the usual transient or unbalanced variations, due to unsymmetrical magnetic or electrical conditions. Such loop-circulating currents lower the stability and efficiency of the machine and may arise from a number of causes, generally resulting from mechanical imperfections in the construction of the metadyne dynamo-electric machine, such as unequal brush spacing, unequal brush pressure, uneven brush commutator contact, unequal reluctances or resistances in various circuits, or some similar cause. These loop-circulating currents are in effect components of current which are superimposed upon the normal metadyne load currents, and the resultant non-uniform metadyne currents may be considered as composed of two components, one component in both load loops being uniform in direction and magnitude, and a non-uniform component of equal magnitude and opposite in direction in each loop. The magnitude of the different components may be readily determined, and the uniform or symmetrical component, that is, the component of equal magnitude and same direction in both loops is equal to one-half of the sum of the two unequal non-uniform resultant currents, and the component of equal magnitude and opposite direction in the two loops is equal to one-half the difference between the unequal non-uniform resultant currents in the two loops. The unsymmetrical or non-uniform components of current correspond to the loop-circulating currents which are superimposed upon the normal uniform metadyne load currents.

An object of my invention is to provide an arrangement for increasing the stability of a direct current metadyne dynamo-electric machine, utilized in a system of the type described above.

Further objects and advantages of my invention will become apparent in the following description referring to the accompanying drawings, and the features of novelty which characterize my invention will be pointed out with particularity in the claims annexed to, and forming a part of this specification.

For a better understanding of my invention, reference is made to the acompanying drawings, wherein Fig. 1 illustrates a metadyne dynamo-electric machine provided with primary and secondary stabilizing field exciting windings both connected in the same load loop and arranged on the same pole piece having its axis intersecting the minor arc of armature conductors connected directly across the same load loop; Fig. 2 represents a metadyne dynamo-electric machine provided with primary and secondary stabilizing field exciting windings both connected in the same load loop and both arranged on pole pieces along the same diametrical axis intersecting the minor arc of armature conductors connected across the same load loop, each pole piece being provided with only a primary or only a secondary stabilizing field exciting winding; Fig. 3 illustrates a metadyne dynamo-electric machine provided with primary and secondary stabilizing field exciting windings which are both connected in the same load loop, the primary stabilizing field exciting winding being arranged on a pole piece having its axis intersecting the minor arc of armature conductors connected across the same load loop, and the secondary stabilizing field exciting winding being arranged on a pole piece having its axis intersecting a minor arc of armature conductors connected between a primary brush of one load loop and a secondary brush of another load loop; Fig. 4 illustrates a metadyne dynamo-electric machine provided with primary and secondary stabilizing field exciting windings, both connected in the same load loop and arranged on separate pole pieces having the same diametrical axis intersecting a minor arc of armature conductors connected between a primary brush of one load loop and a secondary brush of another load loop; Fig. 5 illustrates a metadyne dynamo-electric machine provided with primary and secondary stabilizing field exciting windings connected in the same load loop and arranged on each of a pair of pole pieces having their axis intersecting the minor arc of armature conductors connected directly across the load loop; Fig. 6 illustrates a metadyne dynamo-electric machine provided with primary and secondary stabilizing field exciting windings as shown in Fig. 2, and primary and secondary stabilizing field exciting windings as shown in Fig. 4; Fig. 7 illustrates a metadyne dynamo-electric machine provided with a secondary stabilizing field exciting winding connected in one load loop and arranged on a pole piece having its axis intersecting a minor arc of armature conductors connected across the same load loop, and another secondary stabilizing field exciting winding connected in the other load loop, and arranged on a pole piece having its axis intersecting a minor arc of armature conductors connected between a primary brush of one load loop and a secondary brush of the other load loop; Fig. 8 illustrates a metadyne dynamo-electric machine provided with a primary stabilizing field exciting winding connected in one load loop and arranged on a pole piece having its axis intersecting a minor arc of armature conductors connected across the same load loop, and another primary stabilizing field exciting winding connected in the other load loop and arranged on a pole piece having its axis intersecting a minor arc of armature conductors connected between a primary brush of one load loop and a secondary brush of the other load loop; Fig. 9 illustrates dynamo-electric machine provided with pole pieces arranged intermediate the primary and secondary commutating zones, and having primary stabilizing field exciting windings connected in each load loop arranged on each pole piece, and secondary stabilizing field exciting windings connected in one load loop arranged on the pole pieces having their axis intersecting the minor arc of armature conductors connected across the same load loop, and other secondary stabilizing field exciting windings connected in the other load loop arranged on the pole pieces having their axis intersecting a minor arc of armature conductors between a primary brush of one load loop and a secondary brush of the other load loop; and Fig. 10 illustrates a metadyne dynamo-electric machine provided with primary and secondary stabilizing field exciting windings connected in one load loop and arranged on pole pieces having their axis intersecting the minor arc of armature conductors connected across the same load loop, and primary and secondary stabilizing field exciting windings arranged on pole pieces having their axis intersecting a minor arc of armature conductors between a primary brush of one load loop and a secondary brush of the other load loop.

Referring to the drawings, the same reference numerals in the various figures refer to the same parts, and I have shown in Fig. 1, a metadyne dynamo-electric machine arranged as a transformer provided with an armature 11 having a primary brush set including brushes 12 and 13, and a secondary brush set including brushes 14 and 15, electrically displaced from the primary brush set to provide a primary circuit and a secondary circuit through the armature 11. The metadyne dynamo-electric machine is provided with a stationary member arranged to provide a path of low magnetic reluctance for the fluxes set up by the armature currents, and is provided with a frame 16 and pole pieces 17, 18, 19, and 20 arranged intermediate the commutating zones of the armature 11. The primary brush 12 is connected at 21 to a source of electrical power supply 22, and the primary brush 13 is connected to ground at 23. An electrical load, comprising a motor 24, is connected between the primary brush 13 and the secondary brush 15, and another electrical load, comprising a motor 25, is connected between the primary brush 12 and the secondary brush 14. As explained above, this type of system has been termed an 8 connected metadyne system.

In order to increase the stability of the metadyne machine, it is desirable to counteract any transient or unbalanced disturbances, as well as loop-circulating parasitic currents, and since the transient or unbalanced disturbances will occur in both loops in the same direction and magnitude, and generally will be of greater magnitude than the parasitic loop circulating currents, it is desirable that the compensation of the loop-circulating currents, also compensate for the transient or unbalanced disturbances. In certain cases, where the compensation of the loop-circulating currents by the stabilizing field exciting windings would prevent the compensation of the transient or unbalanced disturbances, it is preferable to compensate only the transient or unbalanced disturbances. I provide a primary stabilizing field exciting winding 26 on the pole piece 17 of the stationary member of the metadyne arranged to induce in the conductors forming the armature primary circuit an electromotive force opposite in direction to any primary transient or unbalanced disturbance, and a secondary stabilizing field exciting winding 27 also arranged on the pole piece 17 to induce in the conductors forming the armature secondary circuit an electromotive force opposite in direction to any secondary transient or unbalanced disturbances, and thus compensate for instability caused by transient or unbalanced disturbances. In order to compensate for parasitic loop-circulating currents, these special field exciting windings are arranged so as to induce in the armature conductors forming part of the loop circuit an electromotive-force which is opposed to the electrical difference of potential causing these loop-circulating currents. If these loop-circulating currents tend to occur in both loops in the same direction, and are of the same magnitude, they will have the same effect as transient or unbalanced disturbances, and be compensated by any arrangement which compensates for transient or unbalanced disturbances. Furthermore, the unsymmetrical conditions, described above, which cause the circulation of loop currents of equal magnitude and opposite direction in the two loops, requires that the stabilizing field exciting windings be arranged in a particular manner in order to avoid aggravating the undesirable loop-circulating currents when compensating for the transient or unbalanced disturbances.

An analysis of the normal load currents flowing through the armature of a metadyne will indicate the direction in which stabilizing field exciting windings must be energized in order to compensate or stabilize for unbalanced or transient voltage and current disturbances, as well as for loop-circulating parasitic currents. If an unbalanced or transient primary disturbance occurs, it will be of equal magnitude and in the same direction throughout the primary armature circuit and, since the primary current is limited by a counter-electromotive force induced in the primary armature circuit by the secondary armature reaction, any variation in the net or resultant excitation in the direction of the secondary armature reaction produces a variation in the opposite sense in the primary current. Thus, it is seen that in order to stabilize or compensate for primary current variations, it is necessary that the excitation along the axis of the secondary armature reaction be varied in magnitude and in the same sense in accordance with the primary current variation. The primary stabilizing field exciting windings must be arranged to provide a component of flux in the same direction as the secondary armature reaction, and proportional in magnitude and in the same sense as the primary current variations. Since the secondary voltage of a metadyne is dependent upon the primary armature reaction, any variation in the primary armature reaction will produce a corresponding variation in the secondary voltage. Therefore, if a transient or unbalanced disturbance occurs in the secondary armature circuit, it is necessary that the net or resultant excitation along the direction of the primary armature reaction flux be varied in a sense opposite to the variation in the secondary circuit in order to damp out the secondary circuit disturbance. The secondary stabilizing field exciting winding must be arranged to produce a component of excitation proportional to the secondary transient or unbalanced disturbance and opposite in direction to the primary armature reaction. However, as explained above, under certain operating conditions, loop-circulating currents occur in an 8 connected metadyne system. An analysis of the arrangement of stabilizing field exciting windings arranged on pole pieces having their axis intermediate the primary and secondary commutating zones of the armature shows that if primary or secondary stabilizing field exciting windings are connected in both loops along the same diametrical axis, they may be arranged to stabilize for the unbalanced or transient disturbances, but if loop-circulating currents occur which are of equal magnitude and opposite in direction in both loops, the flux produced by the primary and the secondary stabilizing field exciting windings in the two loops will be opposite in direction and produce no stabilizing effect on the loop-circulating currents. Thus, the primary and secondary stabilizing field exciting windings along any diametrical axis must be connected in only one load loop in order to stabilize for loop-circulating currents. In accordance with this analysis, in Fig. 1 the primary stabilizing field exciting winding 26 is connected between the primary brush 12 and the connection 21, while the secondary stabilizing field exciting winding 27 is connected in the same load loop in series with the motor 25 and the secondary brush 14.

In an 8 connected metadyne, a load loop is connected between a primary brush and a secondary brush and another load loop is connected between another primary brush and another secondary brush. In such an arrangement, the armature conductors connected directly between a primary brush and a secondary brush across an external load loop form two parallel armature circuits. One of these comprises a minor electrical arc of armature conductors, which in a four-brush metadyne armature would include substantially 90 electrical degrees of arc, and the other parallel circuit includes the remaining major electrical arc of armature conductors, which in a four-brush metadyne armature would include substantially 270 electrical degrees of arc of armature conductors. If primary and secondary stabilizing field exciting windings 26 and 27 respectively, are arranged, as explained above, to compensate for primary and secondary transient or unbalanced disturbances, both being connected in the same load loop including the motor 25, and arranged along the same diametrical axis to produce a flux in a direction having a resultant axis intersecting a minor electrical arc of armature conductors connected between a primary brush and a secondary brush directly across an external load loop, the primary and secondary stabilizing field exciting winding fluxes will be produced in opposite directions in order that the primary stabilizing field exciting winding produces a component of flux in the same direction as the secondary armature reaction, and that the secondary stabilizing field exciting winding produces a component of flux opposite in direction to the primary armature reaction. With such a primary and secondary stabilizing field exciting winding arrangement, a loop-circulating current will produce a loop-circulating current stabilizing flux acting in the same direction in both primary and secondary stabilizing field exciting windings. This loop-circulating stabilizing flux will induce an electromotive force in each of the two parallel armature paths between the brushes across which the external load loop is connected, which will be opposite in direction to the electrical potential difference tending to produce the variable loop-circulating current. In this manner, the loop-circulating currents, as well as the primary and secondary transient or unbalanced disturbances will be damped out by this stabilizing field exciting winding arrangement. As shown, in Fig. 1 the axis of the pole piece 17 intersects a minor electrical arc of armature conductors connected directly between the metadyne primary brush 12 and the metadyne secondary brush 14, across the load loop including the motor 25, so that the resultant axis of the flux produced by the primary and secondary stabilizing field exciting windings 26 and 27 respectively will also lie along this axis. An analysis of the normal load currents flowing through the armature and the stabilizing field exciting windings shows that the primary stabilizing field exciting winding 26 is arranged so as to produce a component of flux in the same direction as the secondary armature reaction, so that any variation in the primary current will produce a corresponding variation in the resultant flux along the axis of the secondary armature reaction, and will, therefore, produce a variation in the primary current in the opposite sense to the variation which set up the primary stabilizing flux variation. The secondary stabilizing field exciting winding 27 produces a component of secondary stabilizing flux which is opposite in direction to the primary armature reaction, and thus, produces a variation in the net primary flux in a sense opposite to the variation in the secondary circuit, thereby damping out the secondary circuit variation. In this manner, primary and secondary current disturbances are damped out by the action of the stabilizing field exciting windings 26 and 27. This analysis only has been given for the transient or unbalanced disturbances. However, since the pole piece 17 is arranged so that the resultant axis of the flux produced by a loop-circulating current produced in the load loop including the motor 25 intersects a minor arc of armature conductors connected directly between the metadyne primary brush 12 and the metadyne secondary brush 14, a voltage will be induced in the armature conductors included between the metadyne primary brush 12 and the metadyne secondary brush 14 which will be opposed to the electrical potential difference causing the circulation of the parasitic loop-circulating current. Since any transient or unbalanced variations occurring in this system will be in the same direction in both primary circuits, and the same in both secondary circuits, the stabilization of these variations by a primary field exciting winding connected in one of the primary circuits and a secondary stabilizing field exciting winding connected in one of the secondary circuits, also will provide complete stabilization of the primary and secondary transient or unbalanced disturbances in the other primary and the other secondary circuits.

It has been found that the loop-circulating currents in an 8 connected metadyne generally are in the form of alternating currents, and that the circulating currents in one load loop are always exactly 180 electrical degrees out of phase with the loop-circulating currents in the other load loop, so that at any given instant they have exactly the same magnitude in opposite directions in the two load loops. An analysis of the armature currents and reactions will show that if the loop-circulating current in one load loop is effectively stabilized, any tendency for a loop-circulating current to flow in the other load loop, so as to increase the primary current of that other load loop and decrease the secondary current thereof, will correspondingly decrease the secondary armature reaction, and consequently, decrease the primary counter-electromotive force, resulting in an increase in the primary current. This increase in primary current will induce a corresponding increase in secondary voltage, producing an increase in secondary current, which will balance out the tendency of the secondary current to decrease, due to the loop-circulating current. A loop-circulating current in the opposite direction similarly inherently will be damped out by the relations of the primary and secondary circuits. Thus, it is readily seen that if the loop-circulating currents are effectively stabilized in one of the load loops, any tendency for a loop-circulating current to arise in the other load loop will be inherently stabilized by the resulting variations in the armature reactions.

Fig. 2 illustrates another embodiment of my invention similar to the construction illustrated in Fig. 1, wherein a primary stabilizing field exciting winding 26 is connected between the primary brush 12, and the line contactor 21, and a secondary stabilizing field exciting winding 27 is connected in the same load loop as the primary stabilizing field exciting winding 26 in series with an electric motor 25, and the metadyne secondary brush 14. In the arrangement shown in this figure, the primary and secondary stabilizing field exciting windings are arranged on separate pole pieces, the primary stabilizing field exciting winding 26 being arranged on the pole piece 17, and the secondary stabilizing field exciting winding 27 being arranged on the pole piece 18. Both of these pole pieces have the same diametrical axis which intersects a minor electrical arc of armature conductors connected directly between the metadyne primary brush 12 and the metadyne secondary brush 14, across the load loop including the motor 25 in the circuit of which the primary and secondary stabilizing field exciting windings are connected. As has been explained with respect to Fig. 1, the resultant axis of the flux produced in such an arrangement by the primary and secondary stabilizing field exciting windings 26 and 27 respectively, is such as to stabilize for primary and secondary transient or unbalanced disturbances, as well as for loop-circulating currents.

Fig. 3 illustrates another embodiment of my invention, wherein the metadyne transformer is provided with a primary stabilizing field exciting winding 28 arranged on the pole piece 18, and connected between the metadyne primary brush 13 and ground at 23, in the primary circuit portion of the load loop including the motor 24. The axis of the pole piece 18, and consequently the axis of the resultant flux produced by the primary stabilizing field exciting winding 28, intersects a minor electrical arc of armature conductors connected directly between the metadyne primary brush 13 and the metadyne secondary brush 15 and across the load loop including the motor 24. As has been explained above, such an arrangement of a primary stabilizing field exciting winding 28 produces a flux which will stabilize for primary transient or unbalanced disturbances, as well as for loop circulating currents, and that a primary stabilizing field exciting winding which is arranged to stabilize for primary transient or unbalanced disturbances in one loop, will also stabilize for primary transient or unbalanced disturbances in the other loop. Furthermore, since loop-circulating currents are of the same magnitude, and the same direction in both primary and secondary circuit portions of the same load loop, stabilization of loop-circulating currents in one loop by a primary stabilizing field exciting winding will stabilize for all loop-circulating currents. A secondary stabilizing field exciting winding 29 is arranged on the pole piece 20 having an axis which intersects a minor arc of armature conductors connected directly between the metadyne primary brush 12 of the load loop including the motor 25, and the secondary metadyne brush 15 connected in the load loop including the motor 24, and is connected to the metadyne secondary brush 15 and in the same load loop as the primary stabilizing field exciting winding 28. The resultant axis of the flux produced by the secondary stabilizing field exciting winding 29 will be the same as the axis of the pole piece 20, and, as has been explained above, a stabilizing field exciting winding having such a resultant axis does not provide for stabilization of loop-circulating currents. This secondary stabilizing field exciting winding, however, produces a component of flux which is opposed to the primary armature reaction, and consequently, produces a variation in the net primary flux in response to transient or unbalanced secondary disturbances in a sense opposite to the variation in the secondary circuit, thereby damping out the secondary circuit variation which sets up the secondary stabilizing flux variation. Thus, both primary and secondary transient or unbalanced disturbances, as well as loop-circulating currents are effectively stabilized, and the primary and secondary stabilizing fluxes are arranged to act along different axes, and induce the stabilizing voltages in different sections of the armature conductors.

Fig. 4 illustrates another embodiment of my invention, wherein a primary stabilizing field exciting winding 30 is arranged on the pole piece 19, and a secondary stabilizing field exciting winding 29 is arranged on the pole piece 20 along the same diametrical axis intersecting a minor electrical arc of armature conductors connected directly between the metadyne primary brush of one load loop and the metadyne secondary brush of the other load loop. The primary stabilizing field exciting winding 30 is connected between the metadyne primary brush 13 and ground 23 in the load loop including the motor 24, and the secondary stabilizing field exciting winding 29 is connected to the metadyne secondary brush 15 and the motor 24 in the same load loop as the primary stabilizing field exciting winding 30. If, in such an arrangement, stabilizing field exciting windings are connected in the same load loop in order to provide for stabilization of primary and secondary transient or unbalanced disturbances the primary and secondary stabilizing fluxes will act in the same direction, so that the primary stabilizing field exciting winding produces a component of flux in the same direction as the secondary armature reaction, and the secondary stabilizing field exciting winding produces a component of flux in the opposite direction to that of the primary armature reaction, and loop-circulating currents flowing through the primary and secondary stabilizing field exciting windings will produce a flux in these two windings in opposite directions, and so that no net or resultant flux will be produced. If the flux produced by each of these windings enters the armature and is cut by the armature conductors, and returns by a leakage path, the voltage induced in opposite coil sides of the winding will be opposed, and no net or resultant loop-circulating current stabilizing voltage will be produced. Furthermore, the flux produced by stabilizing field exciting windings connected in this manner will induce no resultant voltage between primary and secondary brushes connected across the same load loop, as voltages of equal magnitude and opposite direction will be induced in the two coil sides of the windings connected between the brushes of the same load loop. Thus, if stabilizing field exciting windings are arranged in the last-mentioned manner for stabilization of transient or unbalanced disturbances, these field exciting windings will be ineffective in stabilizing for loop-circulating currents. Similarly, if either the primary or the secondary stabilizing field exciting winding is arranged in the reverse direction from that discussed above, so that a loop-circulating stabilizing flux is produced, the corresponding primary or secondary transient or unbalanced stabilizing flux will act in the wrong direction, and will aggravate, instead of stabilize the transient or unbalanced disturbance. As has been previously stated, since the transient or unbalanced disturbances are generally of greater magnitude than the loop-circulating currents, it is preferable that these stabilizing field exciting windings be arranged to stabilize for the transient or unbalanced disturbances, rather than for the loop-circulating currents.

In Fig. 4, the secondary stabilizing field exciting winding 29 is the same as that of the secondary stabilizing field exciting winding 29 in Fig. 3, and, as explained with respect to Fig. 3, produces a stabilization of secondary transient or unbalanced disturbances. The primary stabilizing field exciting winding 30 is arranged to produce a flux in the same direction as the secondary armature reaction, and will, therefore, produce a variation in the primary current in the opposite sense to the variation which set up the primary stabilizing flux variation. In this manner, both primary and secondary transient or unbalanced disturbances are stabilized, although no stabilization of loop-circulating currents is provided by the arrangement shown in this figure, as such an arrangement of stabilizing field exciting windings produces a flux having a resultant axis intersecting a minor arc of armature conductors connected directly between a primary brush of one load loop and a secondary brush of another load loop.

Fig. 5 illustrates another embodiment of my invention, wherein primary stabilizing field exciting windings 31 and 32 are arranged on the pole pieces 17 and 18 respectively, and secondary stabilizing field exciting windings 33 and 34 are also arranged on the pole pieces 17 and 18 respectively, having the same diametrical axis intersecting a minor electrical arc of armature conductors connected directly between the metadyne primary brush 12 and the metadyne secondary brush 14 across the load loop including the electric motor 25. The primary stabilizing field exciting windings 31 and 32 are connected in series with each other between the metadyne primary brush 12, and the line contactor 21, in the primary circuit portion of the load loop including the motor 25. The secondary stabilizing field exciting windings 33 and 34 are connected in series with each other between the metadyne secondary brush 14 and the motor 25, in the same load loop as the primary stabilizing field exciting windings 31 and 32. Such an arrangement of primary and secondary stabilizing field exciting windings provides a more uniform distribution stabilizing flux around the periphery of the armature 11 than that of the previous arrangements, and the stabilizing flux acts in the same manner as the arrangements shown in Figs. 1 and 2. As has been explained with respect to Figs. 1 and 2, both primary and secondary transient or unbalanced disturbances and loop-circulating currents are stabilized by primary and secondary stabilizing field exciting windings arranged in this manner.

Fig. 6 illustrates another embodiment of my invention, wherein a primary stabilizing field exciting winding 26 is arranged on a pole piece 17, and a secondary stabilizing field exciting winding 27 is arranged on a pole piece 18, both connected in the same load loop including the motor 25, and arranged as shown in Fig. 2. As has been explained with respect to this figure, such an arrangement of primary and secondary stabilizing field exciting windings stabilizes for both primary and secondary transient or unbalanced disturbances, as well as for loop-circulating currents. Another primary stabilizing field exciting winding 30 is arranged on a pole piece 19, and a secondary stabilizing field exciting winding 29 is arranged on a pole piece 20 having the same diametrical axis, intersecting a minor arc of armature conductors connected directly between a primary brush of one load loop and a secondary brush of the other load loop. Both of these latter stabilizing field exciting windings are connected in the load loop including the motor 24, and are arranged and connected in the same manner as the stabilizing field exciting windings shown in Fig. 4. As explained with respect to this figure, these stabilizing field exciting windings stabilize for primary and secondary transient or unbalanced disturbances, but do not stabilize loop-circulating currents. This arrangement provides substantially balanced resistances in series with all of the metadyne armature brushes and, thereby, tends to diminish the unsymmetrical structural features which tend to set up loop-circulating currents and consequently, further increase the stability of the metadyne.

Fig. 7 illustrates another embodiment of my invention, wherein the metadyne is provided with only secondary stabilizing field exciting windings. A secondary stabilizing field exciting winding 27 is arranged on the pole piece 17 in series with the metadyne secondary brush 14, and in the load loop including the motor 25, similar to the arrangement shown in Fig. 1. This stabilizing field exciting winding provides a flux having a resultant axis intersecting a minor arc of armature conductors connected directly between a primary brush and a secondary brush across the same external load loop, and as explained with respect to Fig. 1 provides for the stabilization of both the secondary transient or unbalanced disturbances and loop-circulating currents. Another secondary stabilizing field exciting winding 29 is arranged on a pole piece 20 in series with the metadyne secondary brush 15, and the load loop including the motor 24. This arrangement is similar to the secondary stabilizing field exciting winding arrangement shown in Figs. 3 and 4, and stabilizes secondary transient or unbalanced disturbances, but does not stabilize loop-circulating currents.

Fig. 8 illustrates another embodiment of my invention, wherein the metadyne is provided with a primary stabilizing field exciting winding 26 arranged on a pole piece 17 having an axis intersecting a minor arc of armature conductors connected between a primary brush and a secondary brush directly across the same load loop. This primary stabilizing field exciting winding is connected between the metadyne primary brush and the line contactor 21 in the load loop including the electric motor 25, similar to the arrangement shown in Figs. 1 and 2. As explained with respect to these figures, this arrangement of the primary stabilizing field exciting winding stabilizes for primary transient or unbalanced disturbances and for loop-circulating currents. Another primary stabilizing field exciting winding 30 is arranged on the pole piece 19 having its axis intersecting a minor arc of armature conductors connected directly to a metadyne primary brush of one load loop, and a metadyne secondary brush of another load loop. This winding is connected and arranged similar to the primary stabilizing field exciting winding 30 shown in Figs. 4 and 6 and, as explained with respect to these figures, stabilizes for primary transient or unbalanced disturbances, but does not stabilize loop-circulating currents. Thus, it is seen that the arrangement shown in this figure stabilizes both for primary transient or unbalanced disturbances and for loop-circulating currents.

Fig. 9 illustrates an embodiment of my invention, wherein the metadyne is provided with pole pieces 17, 18, 19 and 20 arranged intermediate the primary and secondary commutating zones of the machine, and primary stabilizing field exciting windings 35, 36, 37, and 38 are arranged on each of the pole pieces 20, 18, 19, and 17 respectively, and are connected in series between the metadyne primary brush 12, and the line contactor 21. Another set of primary stabilizing field exciting windings 39, 40, 41 and 42 also are arranged on each of the pole pieces 18, 20, 17 and 19 respectively, and are connected in series between the metadyne primary brush 13 and ground 23. The net or resultant primary stabilizing flux produced by all of these primary stabilizing field exciting windings is in the same direction as the secondary armature reaction, so as to vary the secondary armature reaction in accordance with primary transient or unbalanced variations, and, as explained above, thereby produces a variation in the primary current in the opposite sense to the variation which sets up the primary stabilizing flux variation. In order to obtain such a primary stabilizing flux, it is necessary that the primary stabilizing field exciting windings in the two loops be energized in the same direction by primary transient or unbalanced disturbances. Since loop-circulating currents flow in opposite directions in the two load loops, such an arrangement of primary stabilizing field exciting windings will produce no net or resultant loop-circulating stabilizing flux, as the excitation produced by the two primary stabilizing field exciting windings on each pole will be opposed and produce no net excitation. Secondary stabilizing field exciting windings 33 and 34 are arranged on the pole pieces 17 and 18 respectively, having an axis intersecting a minor arc of armature conductors connected directly between the metadyne primary brush 12 and the metadyne secondary brush 14, across the load loop including the motor 25. This arrangement of secondary stabilizing field exciting windings is similar to that disclosed in Fig. 5, and as explained with respect to this figure, provides a stabilizing flux for secondary transient or unbalanced disturbances, as well as for loop-circulating currents. Secondary stabilizing field exciting windings 43 and 44 are arranged on pole pieces 19 and 20 respectively, having their axis intersecting a minor arc of armature conductors connected directly between a primary brush connected to one load loop, and a secondary brush connected to the other load loop. These secondary stabilizing field exciting windings are connected to the metadyne secondary brush 15 and the electric motor 24. This arrangement provides a secondary stabilizing flux similar to the flux produced by the secondary stabilizing field exciting winding 30, in Figs. 4, 6 and 8, and as explained with respect to these figures, stabilizes secondary transient or unbalanced disturbances but provides no stabilization of loop-circulating currents. Since the loop-circulating currents are stabilized by the field exciting windings 33 and 34, and provision is made for the stabilization of primary and secondary transient or unbalanced disturbances, this arrangement provides for the stabilization of both transient or unbalanced disturbances and loop-circulating currents, and furthermore, provides a uniform distribution of field resistances and reluctances, thereby assisting in preventing the generation of voltages which might produce loop-circulating currents by providing a more symmetrical metadyne construction.

In Fig. 10, the metadyne is provided with primary stabilizing field exciting windings 31 and 32 arranged on pole pieces 17 and 18 respectively, having an axis intersecting a minor arc of armature conductors connected between a primary brush and a secondary brush directly across the same load loop, and are connected in series with the metadyne primary brush 12 to the line 22 by a contactor 21. These primary stabilizing field exciting windings are similar to the primary stabilizing field exciting windings 31 and 32 in Fig. 5, and, as explained with respect to this figure, provide for the stabilization of primary transient or unbalanced disturbances and for loop-circulating currents. Primary stabilizing field exciting windings 45 and 46 are arranged on pole pieces 19 and 20 respectively, having their axis intersecting a minor arc of armature conductors connected directly between a primary brush of one load loop and a secondary brush of another load loop, and are connected in series between the primary brush 13 and ground 23. These primary stabilizing field exciting windings provide a flux similar to the arrangement of the primary stabilizing field exciting winding 30 shown in Figs. 4, 6, and 8, and as explained with respect to these figures, provides for the stabilization of primary transient or unbalanced disturbances, but does not provide for stabilization of loop-circulating currents. Secondary stabilizing field exciting windings 33 and 34 are arranged on pole pieces 17 and 18 respectively, having an axis intersecting a minor arc of armature conductors connected directly between a primary brush and a secondary brush of the same external load loop, and are connected in series with the electric motor 25 and metadyne secondary brush 14 similar to the arrangement shown in Figs. 5 and 9. As pointed out with respect to these figures, such an arrangement of secondary stabilizing field exciting windings stabilizes secondary transient or unbalanced disturbances and loop-circulating currents. Secondary stabilizing field exciting windings 43 and 44 are arranged on pole pieces 19 and 20 respectively, having an axis intersecting a minor arc or armature conductors connected directly between a metadyne primary brush of one load loop, and a metadyne secondary brush of another load loop, similar to the arrangement shown in Fig. 9. As explained with respect to Fig. 9, this arrangement of stabilizing field exciting windings provides for the stabilization of secondary transient or unbalanced disturbances, but does not provide for stabilization of loop-circulating currents. All of the primary and the secondary stabilizing field exciting windings are arranged to stabilize primary and secondary transient or unbalanced disturbances respectively, and the primary stabilizing field exciting windings 31 and 32 and the secondary stabilizing field exciting windings 33 and 34 also are arranged to stabilize for loop-circulating currents. The arrangement shown in this figure provides symmetrical primary and secondary stabilizing field exciting winding resistances and reluctances, providing a symmetrical metadyne construction tending to eliminate the generation of voltages producing loop-circulating currents.

Modifications of the circuit arrangements which I have disclosed will occur to those skilled in the art. I desire it to be understood, therefore, that my invention is not to be limited to the particular embodiments disclosed, and I intend in the appended claims to cover all modifications which do not depart from the spirit and scope of my invention.

What I claim as new and desire to secure by Letters Patent of the United States, is:—

1. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means for inducing an electromotive force in armature conductors connected directly between a primary brush and a secondary brush and through said brushes across an external load in opposition to electrical potential differences tending to cause the circulation of non-uniform currents in said load loops.

2. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means arranged to produce a magnetic flux having a resultant axis intersecting a minor arc of armature conductors connected directly between a primary brush and a secondary brush and through said brushes across one of said loads for inducing an electromotive force in said armature in opposition to electrical potential differences tending to cause the flow of non-uniform currents in said load loops.

3. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a field exciting winding arranged on said stationary member to provide a magnetic flux having a resultant axis intersecting a minor arc of armature conductors connected directly between one of said primary brushes and one of said secondary brushes and through said brushes across one of said loads for inducing an electromotive force in said armature conductors in opposition to electrical potential differences tending to cause the flow of non-uniform currents in said load loops.

4. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means dependent upon the primary current in one of said load loops for inducing an electromotive force in said armature opposed to electrical potential differences tending to produce variations in the primary armature current and for inducing an electromotive force in armature conductors connected directly between a primary brush and a secondary brush and through said brushes across an external load loop in opposition to electrical potential differences tending to produce nonuniform currents in said load loops, and means dependent upon the secondary current in one of said load loops for inducing an electromotive force in said armature opposed to electrical potential differences tending to produce variations in the secondary armature current.

5. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means dependent upon the primary current in one of said load loops for inducing an electromotive force in said armature opposed to electrical potential differences tending to produce variations in the primary armature current, and means dependent upon the secondary current in one of said load loops for inducing an electromotive force in said armature opposed to electrical potential differences tending to produce variations in the secondary armature current and for inducing an electromotive force in armature conductors connected directly between a primary brush and a secondary brush and through said brushes across an external load loop in opposition to electrical potential differences tending to produce non-uniform unequal currents in said load loops.

6. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displayed from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means dependent upon the primary current in one of said load loops for inducing an electromotive force in said armature opposed to electrical potential differences tending to produce variations in the primary armature current and for inducing an electromotive force in armature conductors connected directly across an external load loop in opposition to electrical potential differences tending to produce non-uniform unequal currents in said load loops, and means dependent upon the secondary current in one of said load loops for inducing an electromotive force in said armature opposed to electrical potential differences tending to produce variations in the secondary armature current and for inducing an electromotive force in armature conductors connected directly between a primary brush and a secondary brush and through said brushes across an external load loop in opposition to electrical potential differences tending to produce non-uniform unequal currents in said load loops.

7. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means dependent upon the secondary current in both of said load loops for inducing an electromotive force in said armature opposed to electrical potential differences tending to produce variations in the secondary armature current and dependent upon the secondary current in one of said load loops for inducing an electromotive force in armature conductors connected directly between a primary brush and a secondary brush and through said brushes across an external load loop in opposition to electrical potential differences tending to produce non-uniform unequal currents in said load loops.

8. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means dependent upon the primary current in both of said load loops for inducing an electromotive force in said armature opposed to said electrical potential differences tending to produce variations in the primary armature current, and means dependent upon the secondary current in both of said load loops for inducing an electromotive force in said armature opposed to electrical potential differences tending to produce variations in the secondary armature current and dependent upon the secondary current in one of said load loops for inducing an electromotive force in armature conductors connected directly between a primary brush and a secondary brush and through said brushes across an external load loop in opposition to electrical potential differences tending to produce non-uniform unequal currents in said load loops.

9. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means dependent upon the primary current in both of said load loops to provide a component of magnetic excitation in the same direction as the magnetic excitation produced by current in said secondary armature circuit for providing variations in the resultant excitation along the secondary commutating zone in the same sense as variations of the current in said primary circuit and in accordance therewith, said last mentioned means being dependent upon the current in one of said load loops for inducing an electromotive force in armature conductors connected directly between the primary brush and the secondary brush and through said brushes across an external load loop in oposition to the electrical potential differences tending to produce non-uniform unequal currents in said load loops.

10. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means dependent upon the primary current in both of said load loops for inducing an electromotive force in said armature opposed to electrical potential differences tending to produce variations in the primary armature current, said last mentioned means being dependent upon the current in one of said load loops for inducing an electromotive force in armature conductors connected directly between a primary brush and a secondary brush and through said brushes across an external load loop in opposition to electrical potential differences tending to produce non-uniform unequal currents in said load loops, and means dependent upon the secondary current in both of said load loops for inducing an electromotive force in said armature opposed to electrical potential differences tending to produce variations in the secondary armature current and dependent upon the secondary current in said one of said load loops for inducing an electromotive force in armature conductors connected directly between a primary brush and a secondary brush and through said brushes across an external load loop in opposition to electrical potential differences tending to produce non-uniform unequal currents in said load loops.

11. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a primary stabilizing field exciting winding connected in the primary circuit of one of said load loops arranged to provide a component of magnetic excitation in the same direction as the magnetic excitation produced by current in said secondary armature circuit for providing variations in the resultant excitation along the secondary commutating zone in the same sense as variations of the current in said primary circuit and in accordance therewith and for inducing an electromotive force in said armature in opposition to electrical potential differences tending to cause the flow of non-uniform unequal currents in said load loops.

12. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a primary stabilizing field exciting winding connected in the primary circuit of one of said load loops arranged to provide a component of excitation in the same direction as the magnetic excitation produced by current in said secondary armature circuit for inducing an electromotive force in said armature opposed to electrical potential differences tending to cause variations in the primary armature current, and means including a secondary stabilizing field exciting winding connected in the secondary circuit of one of said load loops arranged to provide a component of excitation in opposition to the magnetic excitation produced by current in said primary armature circuit for inducing an electromotive force in said armature opposite to electrical potential differences tending to cause variations in the secondary armature current, one of said stabilizing field exciting windings being constructed and arranged to induce an electromotive force in said armature in opposition to electrical potential differences tending to cause the flow of non-uniform unequal currents in said load loops.

13. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a secondary stabilizing field exciting winding connected in the secondary circuit of one of said load loops arranged to provide a component of magnetic excitation in opposition to the magnetic excitation produced by current in said primary armature circuit for inducing an electromotive force in said armature opposed to electrical potential differences tending to cause variations in the secondary armature current and for inducing an electromotive force in said armature in opposition to electrical potential differences tending to cause the flow of non-uniform unequal currents in said load loops.

14. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a primary stabilizing field exciting winding connected in the primary circuit of one of said load loops arranged to provide a component of excitation in the same direction as the magnetic excitation produced by current in said secondary armature circuit for inducing an electromotive force in said armature opposed to electrical potential differences tending to cause variations in the primary armature current, and means including a secondary stabilizing field exciting winding arranged along the same diametrical axis as said primary stabilizing field exciting winding and connected in the secondary circuit of one of said load loops arranged to provide a component of excitation in opposition to the magnetic excitation produced by current in said primary armature circuit for inducing an electromotive force in said armature opposite to electrical potential differences tending to cause variations in the secondary armature current, said stabilizing field exciting windings being constructed and arranged to induce an electromotive force in said armature in opposition to electrical potential differences tending to cause the flow of non-uniform unequal current in said load loops.

15. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a primary stabilizing field exciting winding connected in the primary circuit of one of said load loops arranged to provide a component of excitation in the same direction as the magnetic excitation produced by current in said secondary armature circuit for inducing an electromotive force in said armature opposed to electrical potential differences tending to cause variations in the primary armature current, and means including a secondary stabilizing field exciting winding connected in the secondary circuit of said one of said load loops arranged to provide a component of excitation in opposition to the magnetic excitation produced by current in said primary armature circuit for inducing an electromotive force in said armature opposite to electrical potential differences tending to cause variations in the secondary armature current, said primary and secondary stabilizing field exciting windings being arranged along the same diametrical axis to induce an electromotive force in said armature in opposition to electrical potential differences tending to cause the flow of non-uniform unequal currents in said load loops.

16. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a primary stabilizing field exciting winding connected in the primary circuit of one of said load loops arranged on said stationary member to provide a magnetic flux having a resultant axis intersecting a minor arc of armature conductors connected directly across one of said load loops for inducing an electromotive force in said armature conductors in opposition to electrical potential differences tending to cause variations in the primary armature current and for inducing an electromotive force in said armature conductors in opposition to electrical potential differences tending to produce the flow of non-uniform unequal currents in said load loops, and means including a primary stabilizing field exciting winding connected in the primary circuit of one of said load loops arranged on said stationary member to provide a magnetic flux having a resultant axis intersecting a minor arc of armature conductors connected directly between a primary brush of one load loop and a secondary brush of another load loop for inducing an electromotive force in said armature conductors in opposition to electrical potential differences tending to cause variations in the primary armature curent.

17. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electricaly displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a primary stabilizing field exciting winding connected in the primary circuit of one of said load loops arranged on said stationary member to provide a magnetic flux having a resultant axis intersecting a minor arc of armature conductors connected directly between a primary brush and a secondary brush and through said brushes across one of said load loops for inducing an electromotive force in said armature conductors in opposition to electrical potential differences tending to cause variations in the primary armature current, and means including a secondary stabilizing field exciting winding connected in the secondary circuit of one of said load loops arranged on said stationary member to provide the magnetic flux having a resultant axis intersecting a minor arc of armature conductors connected directly between a primary brush and a secondary brush and through said brushes across one of said load loops for inducing an electromotive force in said armature conductors in opposition to electrical potential differences tending to cause variations in the secondary armature current, said primary and secondary stabilizing field exciting windings being arranged along substantially the same diametrical axis and connected in the same load loop.

18. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, and means including a secondary stabilizing field exciting winding connected in the secondary circuit of one of said load loops and a second secondary stabilizing field exciting winding connected in the secondary circuit of the other of said load loops arranged to provide a component of magnetic excitation in opposition to the magnetic excitation produced by current in said primary armature circuit for inducing an electromotive force in said armature opposed to electrical potential differences tending to cause variations in the secondary armature current, one of said secondary stabilizing field exciting windings being arranged to produce a flux having a resultant axis intersecting a minor arc of armature conductors connected directly between a primary brush and a secondary brush and through said brushes across one of said load loops and the other of said secondary stabilizing field exciting windings being arranged to produce a flux having a resultant axis intersecting a minor arc of armature conductors connected directly between a primary brush of one load loop and a secondary brush of another load loop.

19. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a plurality of primary stabilizing field exciting windings connected in the primary circuit of one of said load loops for inducing an electromotive force in said armature opposed to electrical potential differences tending to cause variations in the primary armature current, and means including a plurality of secondary stabilizing field exciting windings connected in the secondary circuit of one of said load loops for inducing an electromotive force in said armature opposed to electrical potential differences tending to cause variations in the secondary armature current, all of said secondary stabilizing field exciting windings being arranged to produce a magnetic excitation having a resultant axis intersecting a minor arc of armature conductors connected directly between a primary brush and a secondary brush and through said brushes across one of said load loops and being connected in only one of said load loops.

20. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a plurality of primary stabilizing field exciting windings connected in the primary circuit of one of said load loops and a plurality of primary stabilizing field exciting windings connected in the primary circuit of the other of said load loops for inducing an electromotive force in said armature opposed to electrical potential differences tending to cause variations in the primary armature current, and means including a plurality of secondary stabilizing field exciting windings connected in the secondary circuit of one of said load loops and arranged to produce a flux having a resultant axis intersecting a minor arc of armature conductors connected directly between a primary brush and a secondary brush and through said brushes across an external load loop and a plurality of secondary stabilizing field exciting windings connected in the secondary circuit of the other of said load loops and arranged to produce a flux having a resultant axis intersecting a minor arc of armature conductors connected directly between a primary brush of one load loop and a secondary brush of another load loop for inducing an electromotive force in said armature opposed to electrical potential differences tending to cause variations in the secondary armature current, all of said secondary stabilizing field exciting windings arranged to produce a magnetic excitation having a resultant axis intersecting a minor arc of armature conductors connected directly between a primary brush and a secondary brush and through said brushes across one of said load loops and being connected in only one of said load loops.

21. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary set and another brush of said secondary brush set forming a second load loop, means including a plurality of primary stabilizing field exciting windings connected in the primary circuit of one of said load loops and arranged to produce a flux having a resultant axis intersecting a minor arc of armature conductors connected directly between a primary brush and a secondary brush and through said brushes across an external load loop and a plurality of primary stabilizing field exciting windings connected in the primary circuit of the other of said load loops and arranged to produce a flux having a resultant axis intersecting a minor arc of armature conductors connected directly between a primary brush of one load loop and a secondary brush of another load loop for including an electromotive force in said armature opposed to electrical potential differences tending to cause variations in the primary armature current, and means including a plurality of secondary stabilizing field exciting windings connected in the secondary circuit of one of said load loops and arranged to produce a flux having a resultant axis intersecting a minor arc of armature conductors connected directly between a primary brush and a secondary brush and through said brushes across an external load loop and a plurality of secondary stabilizing field exciting windings connected in the secondary circuit of the other of said load loops and arranged to produce a flux having a resultant axis intersecting a minor arc of armature conductors connected directly between a primary brush of one load loop and a secondary brush of another load loop for inducing an electromotive force in said armature opposed to electrical potential differences tending to cause variations in the secondary armature current, all of said stabilizing field exciting windings arranged to produce a magnetic excitation having a resultant axis intersecting a minor arc of armature conductors connected directly between a primary brush and a secondary brush and through said brushes across one of said load loops being connected in only one of said load loops.

22. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a primary stabilizing field exciting winding connected in the primary circuit of one of said load loops arranged on said stationary member to provide a component of magnetic excitation in the same direction as the magnetic excitation produced by current in said secondary armature circuit for inducing an electromotive force in said armature opposed to electrical potential differences tending to produce variations in the primary armature current, and means including a secondary stabilizing field exciting winding connected in the secondary circuit of one of said load loops arranged on said stationary member to provide a component of magnetic excitation in opposition to the magnetic excitation produced by current in said primary armature circuit for inducing an electromotive force in said armature opposed to electrical potential differences tending to produce variations in the secondary armature current, all of said stabilizing field exciting windings arranged to produce a magnetic excitation having a resultant axis intersecting a minor arc of armature conductors connected directly between a primary brush and a secondary brush and through said brushes across one of said load loops being connected in only one of said load loops.

23. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a primary stabilizing field exciting winding connected in the primary circuit of one of said load loops arranged to provide a component of excitation in the same direction as the magnetic excitation produced by current in said secondary armature circuit for inducing an electromotive force in said armature opposed to electrical potential differences tending to cause variations in the primary armature current, and means including a secondary stabilizing field exciting winding connected in the secondary circuit of one of said load loops arranged to provide a component of excitation in opposition to the magnetic excitation produced by current in said primary armature circuit for inducing an electromotive force in said armature opposed to electrical potential differences tending to cause variations in the secondary armature current, all of said stabilizing field exciting windings arranged to produce a flux having a resultant axis intersecting a minor arc of armature conductors directly connected between a primary brush and a secondary brush and through said brushes across one of said load loops being connected only in one of said load loops.

24. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a plurality of primary stabilizing field exciting windings connected in the primary circuit of one of said load loops for inducing an electromotive force in said armature opposed to electrical potential differences tending to cause variations in the primary armature current, and means including a plurality of secondary stabilizing field exciting windings connected in the secondary circuit of one of said load loops for inducing an electromotive force in said armature opposed to electrical potential differences tending to cause variations in the secondary armature current, all of said secondary stabilizing field exciting windings arranged to produce a magnetic excitation having a resultant axis intersecting a minor arc of armature conductors connected directly between a primary brush and a secondary brush and through said brushes across one of said load loops being connected only in one of said load loops.

25. A metadyne dynamo-electric machine provided with a stationary member and an armature having winding conductors and a commutator connected thereto, means including a primary brush set and a secondary brush set associated with said commutator for providing a primary circuit and a secondary circuit respectively through said armature, said secondary brush set being electrically displaced from said primary brush set, an electrical load, means for connecting said electrical load across a brush of said primary brush set and a brush of said secondary brush set forming a load loop, a second electrical load, means for connecting said second electrical load across another brush of said primary brush set and another brush of said secondary brush set forming a second load loop, means including a plurality of primary stabilizing field exciting windings connected in the primary circuit of one of said load loops for inducing an electromotive force in said armature opposed to electrical potential differences tending to cause variations in the primary armature current, and means including a plurality of secondary stabilizing field exciting windings connected in the secondary circuit of one of said load loops for inducing an electromotive force in said armature opposed to electrical potential differences tending to cause variations in the secondary armature current, all of said stabilizing field exciting windings arranged to produce a magnetic excitation having a resultant axis intersecting a minor arc of armature conductors connected directly between a primary brush and a secondary brush and through said brushes across one of said load loops being connected in only one of said load loops.

GIUSEPPE M. PESTARINI.

CERTIFICATE OF CORRECTION.

Patent No. 2,138,666.   November 29, 1938.

GIUSEPPE M. PESTARINI.

It is hereby certified that error appears in the printed specification of the above numbered patent requiring correction as follows: Page 2, second column, line 12, for the reference numeral "18" read 19; page 8, second column, line 13, claim 6, for "displayed" read displaced; page 12, second column, line 16, claim 21, for the word "including" read inducing; and that the said Letters Patent should be read with this correction therein that the same may conform to the record of the case in the Patent Office.

Signed and sealed this 10th day of January, A. D. 1939.

Henry Van Arsdale (Seal)   Acting Commissioner of Patents.